United States Patent
Lu et al.

(10) Patent No.: US 10,500,618 B2
(45) Date of Patent: Dec. 10, 2019

(54) APPARATUS AND METHOD FOR REMEDIATING TRICHLOROETHYLENE-POLLUTING SOILS BY INTEGRATED ROTATED MIGRATION AND PRB

(71) Applicant: NORTH CHINA ELECTRIC POWER UNIVERSITY, Beijing (CN)

(72) Inventors: Hongwei Lu, Beijing (CN); Lixia Ren, Beijing (CN); Li He, Beijing (CN); Yizhong Chen, Beijing (CN); Jing Li, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 15/456,248

(22) Filed: Mar. 10, 2017

(65) Prior Publication Data
US 2017/0282230 A1 Oct. 5, 2017

(30) Foreign Application Priority Data

Mar. 31, 2016 (CN) .......................... 2016 1 0201551

(51) Int. Cl.
*B09C 1/08* (2006.01)
(52) U.S. Cl.
CPC .......... *B09C 1/085* (2013.01); *B09C 2101/00* (2013.01)
(58) Field of Classification Search
CPC ................................................. C02F 2103/06
See application file for complete search history.

(56) References Cited

U.S. PATENT DOCUMENTS

| 5,415,744 | A  | * | 5/1995 | Jacobs | B01D 61/56 204/515 |
|---|---|---|---|---|---|
| 6,193,867 | B1 | * | 2/2001 | Hitchens | B01D 61/56 204/515 |
| 8,926,814 | B2 | * | 1/2015 | He | B09C 1/02 204/515 |
| 8,968,550 | B2 | * | 3/2015 | He | B09C 1/085 205/743 |
| 2007/0116524 | A1 | * | 5/2007 | Shiau | B09C 1/002 405/128.15 |
| 2010/0209194 | A1 | * | 8/2010 | Guite | B09C 1/002 405/128.75 |
| 2014/0360888 | A1 | * | 12/2014 | He | B09C 1/085 205/743 |

* cited by examiner

*Primary Examiner* — Salil Jain
(74) *Attorney, Agent, or Firm* — Syncoda LLC; Feng Ma

(57) ABSTRACT

Apparatus and method are provided for remediating trichloroethylene-polluting soils by integrated rotated migration and PRB. The apparatus includes a device of electrokinetic remediation, a PRB and a device of injection of surface active agents. The main components of the device of electrokinetic remediation and PRB include cathode, anode, electrode chamber and PRB. A liquid injection pipe is installed between various electrodes and PRBs. The operation of each device is controlled by each control system. The disclosure integrated rotated migration and PRB for remediating contaminants. Surface active agents is helpful for dispersing TCE from soil. The arrangement of the electrode and the PRB greatly shortens distances and time of pollutant migration, which accelerate the speed of remediation and reduce post-processing procedures. In the process of treatment, the three technical methods promote each other, and have the advantages of good repair effect, short time, no secondary pollution and easy operation.

1 Claim, 3 Drawing Sheets

APPARATUS AND METHOD FOR REMEDIATING TRICHLOROETHYLENE-POLLUTING SOILS BY INTEGRATED ROTATED MIGRATION AND PRB

CROSS-REFERENCE TO RELATED APPLICATIONS

The present application claims priority to Chinese Patent Application No. CN 201610201551.3 filed on Mar. 31, 2016, the disclosure of which is hereby incorporated by reference in its entirety.

BACKGROUND

The present disclosure relates to the field of remediation technology of trichloroethylene-polluted environments and involves a device and method of multi-method-combined remediation of trichloroethylene-polluted environments.

As an important volatile organic solvent, trichloroethylene (TCE) is widely applied to industries such as electroplating, dry cleaning and metal processing. Due to its extensive use and unreasonable discharge, it severely pollutes environments of soil and groundwater. TCE is a volatile organic compound with effects of carcinogenicity, teratogenesis and mutagenicity. Its degradation products are also toxic carcinogenic substances. In 1976, it was listed in 129 precedence-controlled pollutants issued by United States Environmental Protection Agency and the blacklist of China's environmental particular pollutants. Once TCE gets into an aeration zone or underground water, it usually exists long in various forms such as a phase of immiscible residual fluid, a dissolved phase, a gaseous phase and an adsorbed phase with low biological decomposability. As the half-life period of TCE in soil is about six to eighteen months, it exists long and pollutes environments severely after percolating through soil and underground water, which is extremely difficult to restore and control.

In consideration of universality of TCE pollution, harmfulness to human beings and complexity of its research and remediation, the remediation technology of TCE-polluting underground environments has become an issue attracting general attention at home and abroad in recent years. The present common methods can be divided into physical methods, chemical methods and biological methods. The physical methods mainly include gas explosion and active carbon adsorption. In the technology of gas explosion, a gas injection well is used to inject compressed air into an area with ground water pollution to remove pollutants by movement of air. As for active carbon, due to its large area, it can fully contact with pollutants to achieve adsorption and purification. The chemical methods are classified into methods of chemical chemical-reagent oxidation and photo-catalytic oxidation in which chemical reagents include $H_2O_2$, Fenton reagents, $KMnO_4$ and $O_3$ etc. Photo-catalytic oxidation refers to a method of removing contaminants in waste water by oxidation of catalysts under light of a certain wave length. Chemical reduction uses zero-valent iron and bimetallic particles to reduce TCE into less harmful hydrocarbon. The biological methods include technology of microbial remediation and phytoremediation. For microbial remediation, it primarily utilizes microorganism in natural environments or added microorganism to decompose pollutants. As to phytoremediation, it purifies contaminants in soil or water by functions of plants such as absorption, volatilization, rhizofiltration and stabilization.

Due to limitations of utilization of each method, a more effective device and method of soil remediation and purification is still needed.

SUMMARY

Recognizing the deficiencies in existing technologies, the inventors of the present disclosure aim at remediating soil polluted by TCE through technology combining electrokinetic remediation, Permeable Reactive Barriers (PRBs) and surface active agents. Specifically, the electrokinetic remediation technology galvanizes at both sides of polluted soil to induce directional migration of free pollutants with charges to regions of cathode and anode and then carried out centralized treatment in regions of cathode and anode to achieve the aim of reducing pollutants in soil. PRB is a Permeable Reactive Barrier which is constituted by active reaction mediums and/or active adsorbents and perpendicular to a contaminated area. When pollutants pass the PRB during migration, active reaction mediums play roles such as adsorption, precipitation and degradation in them to remove them from soil. A surface-active agent refers to a substance that can reduce tension of liquid-liquid, solid-liquid and gas-liquid interfaces with functions such as solubilization, emulsification and madefaction. It can dissolve indissolvable hydrocarbon compounds and other organic compounds to enhance the desorption efficiency of organic pollutants in soil for remediation.

The first aim of the present disclosure is to provide a device of remediating trichloroethylene-polluted soil.

The second aim of the present disclosure is to provide a method of remediating trichloroethylene-polluted soil by using devices mentioned above.

In order to realize aims above, the present disclosure adopts the following technical solution: a device for remediating trichloroethylene-polluted soil, comprising: a device of electrokinetic remediation, a PRB and a device of injection of surface active agents, where a device of electrokinetic remediation consists of:

at least two pairs of electrodes including a cathode and an anode for each pair, which are arranged alternately in a radial pattern, a stabilized voltage supply, in which electrodes connect with the supply by parallel connection, an electrode chamber including an anode compartment and a cathode compartment accommodating mentioned cathodes and anodes respectively, an electrolytic bath with an anolyte tank for storing alkaline electrolyte and a catholyte tank for storing acidic electrolyte, in which the anolyte tank and the catholyte tank connect with the anode compartment and the cathode compartment respectively by the first peristaltic multi-channel pump to carry the alkaline electrolyte and the acidic electrolyte to the anode compartment and the cathode compartment through channels, the first control system, connecting with various electrode chambers via the first peristaltic multi-channel pump to control delivery of the alkaline electrolyte and the acidic electrolyte, an electrolyte treatment tank, connecting with various electrode chambers via the second peristaltic multi-channel pump to receive discharged electrolytes, and the second control system, connecting with various electrode chambers via the second peristaltic multi-channel pump to control discharge of electrolytes from various electrode chambers to the electrolyte treatment tank;

PRBs are arranged between each pair of electrodes in a radial pattern; and a device of injection of surface active agents, including:

a liquid injection pipe, installed in soil between various electrodes and PRBs for injecting surface active agents into polluted soil, a reservoir of surface active agents, connecting with the liquid injection pipe for storing surface active agents, and the third control system, connecting the liquid injection pipe and the reservoir of surface active agents to control injection of surface active agents.

Furthermore, the present disclosure also provides a method of a method of remediating trichloroethylene-polluted soil by using devices mentioned above and its specific steps are as follows:

(1) Carry out radial arrangement of the device of remediating trichloroethylene-polluted soil, center the radial structure of electrode pairs in most polluted regions and ensure that the device of remediating trichloroethylene-polluted soil covers all polluted regions;

(2) Inject surface active agents in the reservoir of surface active agents into the liquid injection pipe through the third control system and further into the polluted soil, in which the injected amount of surface active agents is 2~4 times of the volume of the restored soil at an injection speed of 1.5~2.5 ml/min;

(3) Via the first control system, inject the alkaline electrolyte in the anolyte tank into the anode compartment and the acidic electrolyte in the catholyte tank into the cathode compartment. Start the device of electrokinetic remediation with a voltage gradient of 1.5~4.5 v/cm. During remediation, keep monitoring electrolyte saturation of each electrode chamber at the same time. If the electrolyte of an electrode chamber is saturating, discharge the saturating electrolyte into electrolyte treatment tank through the second control system, where trichloroethylene is absorbed by PRBs in the course of rotating-moving.

(4) After electrifying for 24~48 h, turn off the stabilized voltage supply; and (5) Repetition of Steps (2)-(4) is feasible.

According to a mode of carrying out the disclosure, Step (1) further includes adjustment of numbers of electrode pairs, intersection angles between adjacent electrodes, lengths of various electrodes and PRBs, intersection angles between various electrodes and PRBs and replacing times of PRBs in accordance with conditions of polluted soil.

Advantageous effects of the disclosure are: (1). Before electrokinetic remediation, to start the device of injection of surface active agents for promoting desorption and solubilization of TCE in polluted soil and dispersing TCE absorbed by soil from soil is conducive to subsequent effective migration and adsorption of TCE; (2). Unlike the traditional technology of parallel arrangement of electrodes, the disclosure adopts radial placement of electrodes which is perpendicular to the horizontal plane and the central axis of radial structure of electrodes is put on most polluted regions to match the pollution degree with remediation strength. As a result, it greatly shortens distances and time of pollutant migration in severely polluted areas; (3). Coaxial installation of PRBs between adjacent electrodes achieves more effective adsorption and interception of TCE in soil, accelerate the speed of remediation and reduce post-processing procedures; (4). This treatment process is clean and safe without secondary pollution.

Figure 1:
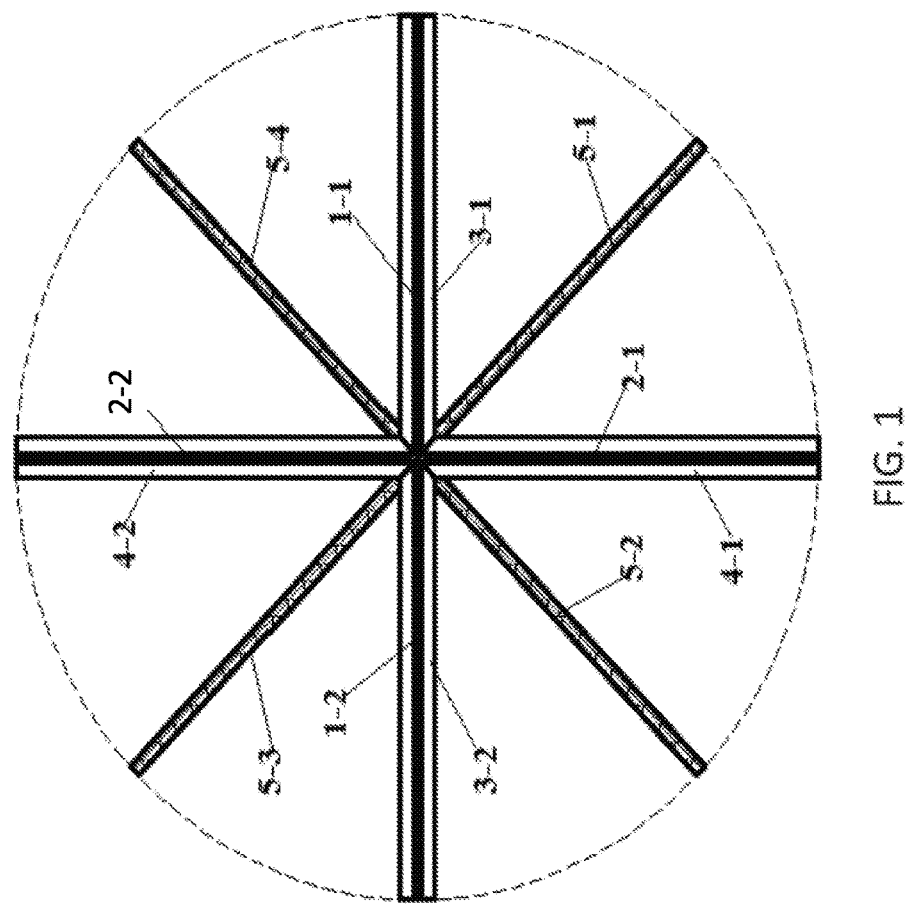
FIG. 1 is a plan view of a cathode and an anode, an electrode chamber and a PRB in accordance with a mode of carrying out the disclosure.

Numerals in the drawing represent: 1—an anode (where 1-1—the first anode part, 1-2—the second anode part), 2—a cathode (where 2-1—the first cathode part, 2-2—the second cathode part), 3—an anode compartment (where, 3-1—the first anode compartment, 3-2—the second anode compartment), 4—a cathode compartment (where, 4-1—the first cathode compartment, 4-2—the second cathode compartment), 5 (5-1, 5-2, 5-3, 5-4)—PRBs, 6—a stabilized voltage supply, 7—the first peristaltic multi-channel pump, 8—the first control system, 9—an anolyte tank, 10—a catholyte tank, 11—the second peristaltic multi-channel pump, 12—the second control system, 13—an electrolyte treatment tank, 14—a liquid injection pipe, 15—the third control system, and 16—a reservoir of surface active agents.

DETAILED DESCRIPTION

Further description of the present disclosure in accordance with accompanying drawings and concrete embodiments is as follows, but technician in this field should understand that the scope of the disclosure is not limited to the following concrete embodiments.

Figure 2:
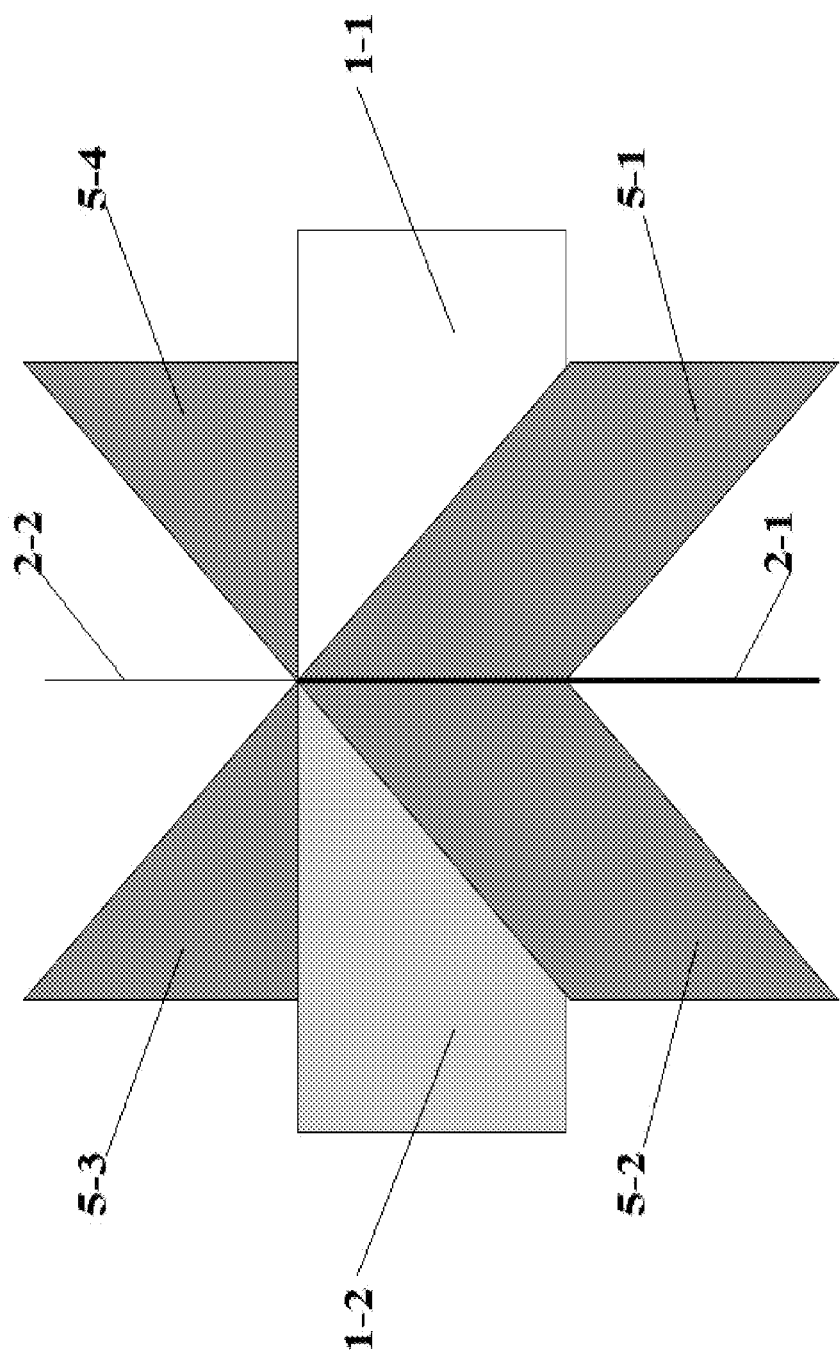
FIG. 2 is a perspective view of a cathode and an anode and a PRB in accordance with a mode of carrying out the disclosure.
Figure 3:
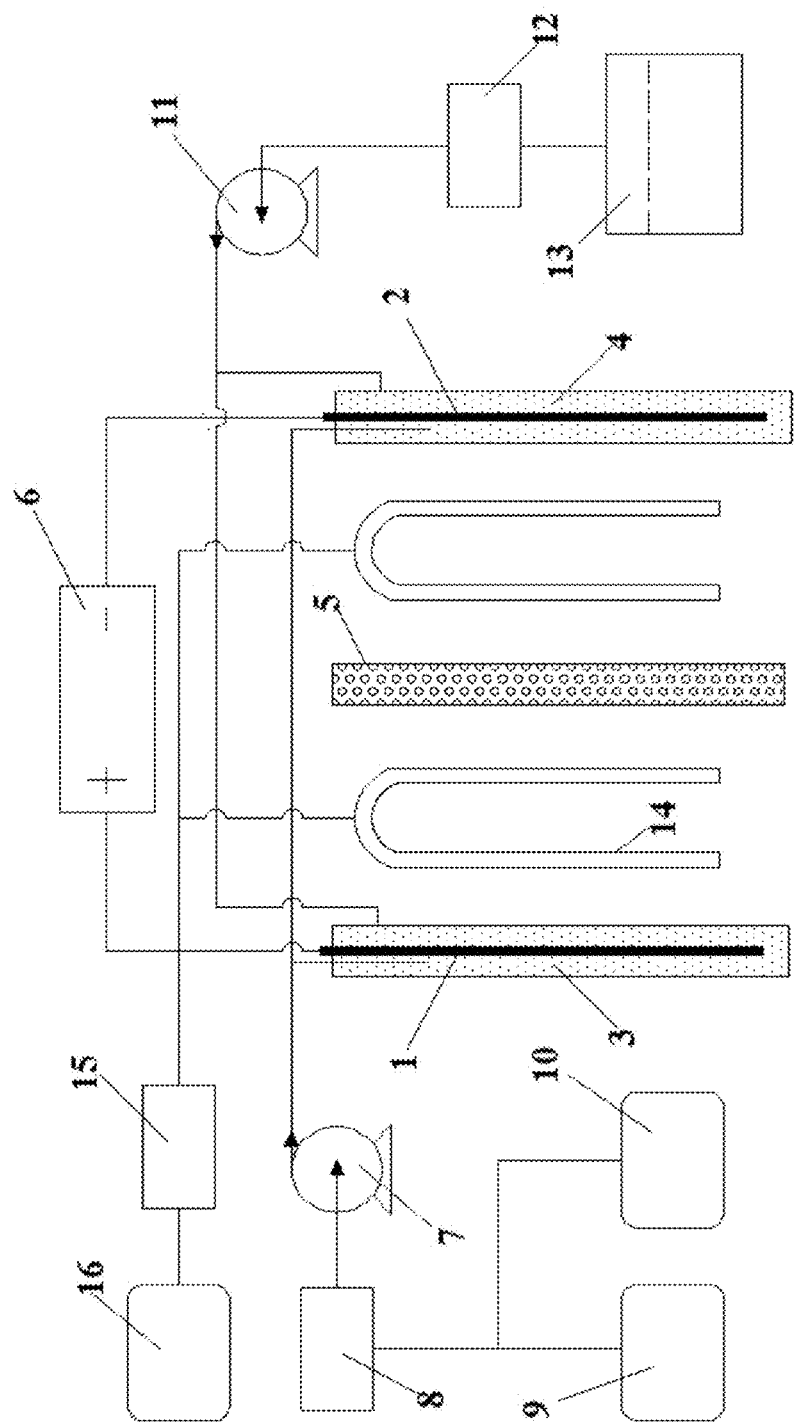
FIG. 3 is a diagram of connection of the device in accordance with a mode of carrying out the disclosure.

According to a mode of carrying out the disclosure, a device for remediating trichloroethylene-polluted soil by rotating-migration and combination of PRB is shown in FIG. 1-3. The overall device is sealed, in which the positive electrode of Stabilized voltage supply 6 connects with first anode part 1-1 and second anode part 1-2 through wires and the negative electrode of Stabilized voltage supply 6 connects with 2-1—the first cathode part and 2-2—the second cathode part through wires; 1-1—the first anode part, 1-2—the second anode part, 2-1—the first cathode part and 2-2—the second cathode part are plate electrodes of coaxial placement that are perpendicular to the horizontal plane, where adjacent electrodes have different polarities and form certain intersection angles; 1-1—the first anode part, 1-2—the second anode part, 2-1—the first cathode part and 2-2—the second cathode part are placed in 3-1—the first anode compartment, 3-2—the second anode compartment, 4-1—the first cathode compartment and 4-2—the second cathode compartment respectively; Coaxial placement of PRB 5 is carried out between adjacent electrodes; 14—a liquid injection pipe is installed between various electrode chambers and PRB 5; 16—a reservoir of surface active agents connects with 14—a liquid injection pipe through 15—the third control system; 9—an anolyte tank and 10—a catholyte tank connect with 8—the first control system by pipes; 8—the first control system connects with various electrode chambers by 7—the first peristaltic multi-channel pump; 13—an electrolyte treatment tank connects with 12—the second control system via pipes and 11—the second peristaltic multi-channel pump and 12—the second control system connects with each electrode chamber.

A device of the disclosure can have two to four pairs of electrodes and two pairs of electrodes is an optimal option. Intersection angles between pairs of electrodes are determined in accordance with pollution degrees of soil. Intersection angles can be properly small for areas with severe pollution and vice versa. An intersection angle between adjacent cathode and anode should range from 60°~120° with an optimal scope of 60°~90°. Of course, under special circumstances, an intersection angle can be less than 60°, such as 25°, 20° and 15°.

In the mode of carrying out the disclosure shown in the drawings, there are two pairs of electrodes with an intersection angle of about 90°.

Generally, electrodes are plates and graphite can be used as both cathode and anode. The size of an electrode relates to the degree of pollution (for example, depths and scopes etc. of polluted soil). Electrodes of proper sizes should be prepared so that the device can cover the entire area of polluted soil after its installation.

Due to radial arrangement of electrodes, pollutants in soil follow rotating routes during their migration. Thus, the device of the disclosure is called a device for remediating trichloroethylene-polluting soil by rotating-migration and combination of PRB.

PRBs are placed between various electrodes in a radial pattern. It would be best to place a PRB in the middle of an intersection angle between cathode and anode. Similarly, PRBs are plates and their sizes are in connection with pollution conditions.

PRBs are PRBs of zero-valent iron and can be padded with adsorbents, such as coarse sand and immobile peat, inside.

With the device above, the method for remediating trichloroethylene-polluted soil by rotating-migration and combination of PRB is used and steps of the method are:

After ensuring that the entire polluted area is covered, install electrode chambers and electrodes. Carry out coaxial placement of four plate electrodes that are perpendicular to the horizontal plane and the co-axis of four plate electrodes should be located in the most polluted area. Polarities of adjacent electrodes are different and they form certain intersection angles. Each electrode lies in an electrode chamber. Coaxial placement of PRB 5 is carried out between adjacent electrodes and a liquid injection pipe is installed between various electrode chambers and PRB 5. The positive electrode of Stabilized voltage supply 6 connects with First anode part 1-1 and Second anode part 1-2 through wires and the negative electrode of Stabilized voltage supply 6 connects with 2-1—the first cathode part and 2-2—the second cathode part through wires. Installation of other parts is shown in FIG. 3.

Operate each electrode chamber and PRB 5 by 15—the third control system at an injection speed of 1.5~2.5 ml/min and stop operation after 6~12 h.

Add corresponding alkaline electrolytes and acidic electrolytes in 9—an anolyte tank and 10—a catholyte tank respectively. After turning on the device of electrokinetic remediation, 9—an anolyte tank and 10—a catholyte tank deliver electrolytes to corresponding anode compartments and cathode compartments respectively through 7—the first peristaltic multi-channel pump and under 8—the first control system. After initiating the system of electrokinetic remediation, during rotating-migration, pollutants are absorbed by PRB 5 with a voltage gradient of 1.5~4.5 v/cm. In the process of remediation, keep monitoring electrolyte saturation of each electrode chamber at the same time. If the electrolyte of an electrode chamber is saturating, extract electrolytes of corresponding electrode chambers and transfer them to 13—an electrolyte treatment tank respectively through 11—the second peristaltic multi-channel pump and under 12—the second control system. After electrifying for 24~48 h, turn off Stabilized voltage supply 6.

According to remediation conditions, repetition of steps of surface active agent injection and rotating-migration is feasible. During remediation, keep monitoring the concentration of TCE in the polluted area and evaluating the remediation effects until TCE in soil reaches the environmental standard.

In the method for remediating trichloroethylene-polluted soil by rotating-migration and combination of PRB of the disclosure, adjustment of numbers of electrode pairs, intersection angles between adjacent electrodes, lengths of various electrodes and PRBs, intersection angles between various electrodes and PRBs and replacing times of PRBs can be conducted in accordance with conditions of polluted soil. However, different polarities of adjacent electrodes should be ensured.

Embodiment (1). Preparation of simulation samples of soil polluted by TCE: gather a soil sample of 1500 g and fire it at a 600° C. with muffle until it reaches constant mass. Screen the sample with a griddle with 1 mm aperture (namely griddle No. 18). Then add TCE in the sample until the concentration of TCE in the sample is 100 mg/kg. Put the sample in a plexiglass box of a radius of 20 cm and a height of 20 cm.

(2). Installation of a device for remediating trichloroethylene-polluted soil by rotating-migration and combination of PRB: as shown in FIGS. 1-3, install the device in the plexiglass box. Both cathode and anodes are graphite plate electrodes with a specification of 15 cm×2 cm×15 cm (L×W×H). Coarse sand and immobile peat are padded in PRBs as mediums (with a ratio of 4:1) with a specification of 15 cm×2 cm×15 cm (L×W×H).

(3). Operation of the device: first, the injection device of surface active agents is started, in which 0.025 g/L rhamnolipid solution is used as the surface active agent and the injection amount of surface active agents is 2.5 times of the volume of the restored soil. During remediation, pH of the anode compartment and the cathode compartment should be 11 and 3.5 respectively.

Results: after electrokinetic remediation, the concentration of TCE in the polluted area was monitored. According to calculation, the removing rate of TCE in soil was 75.6%. After repeating usage of the device, the rate became 84.3%.

Comparison Embodiment

Compared with the embodiment above, the only difference of these two embodiments is parallel arrangement of a pair of electrodes, PRBs between electrodes and injection pipes between electrodes and PRBs. The area of electrodes is the same as that of the embodiment above, so is the area of PRBs. In addition, experimental environments, experimental procedures and experimental parameters etc. of this embodiment are the same as those of the embodiment above. The result showed that after the first operation, the removing rate of TCE in soil was 57.5% and after repeating usage of the device, the rate became 62.6%.

The invention claimed is:

1. A device for remediating soil, comprising: a device of electrokinetic remediation and Permeable Reactive Barriers (PRBs), wherein the device of electrokinetic remediation comprises:

at least two pairs of electrodes including a cathode part and an anode part for each pair, wherein the cathode parts and anode parts are arranged alternately with adjacent parts having different polarities, and forming a radially distributed pattern with an intersection angle between the adjacent parts in a range of 60°-90°, configured to generate a voltage gradient of 1.5-4.5 V/cm, wherein the trichloroethylene is absorbed by the PRBs distributed in a middle of the intersection angle coaxial with the radially distributed pattern, in a course of rotating migration along the radially distributed pattern, wherein the cathode parts and anode parts are plate electrodes disposed perpendicular to a horizontal plane of the trichloroethylene-polluted soil with an axis of the radially distributed pattern placed at a most polluted region, a stabilized voltage supply, in which electrodes connect with the supply by parallel connection, electrode chambers including an anode chamber and a cathode chamber accommodating the anode parts and cathode parts, respectively, wherein pH of the anode chamber and the cathode chamber are kept at approximately 11 and 3.5, respectively, an electrolytic bath with an anolyte tank for storing alkaline electrolyte and a catholyte tank for storing acidic electrolyte, in which the anolyte tank and the catholyte tank connect with the anode chamber and the cathode chamber respectively by a first peristaltic multi-channel pump to carry the alkaline electrolyte and the acidic electrolyte to the anode chamber and the cathode chamber through channels, a first control system, connected with various electrode chambers via the first peristaltic multi-channel pump to control delivery of the alkaline electrolyte from the anolyte tank to the anode chamber and the acidic electrolyte from the catholyte tank to the cathode chamber, wherein the first control system is further configured to monitor electrolyte saturation of each electrode chamber, an electrolyte treatment tank, connecting with various electrode chambers via a second peristaltic multi-channel pump to receive discharged electrolytes, a second control system, connected with various electrode chambers via the second peristaltic multi-channel pump to control discharge of electrolytes from various electrode chambers to the electrolyte treatment tank upon the electrolyte saturation as monitored by the first control system;

and a device of injection configured to inject surface active agents comprising a 0.025 g/L rhamnolipid solution at an injection rate of 1.5-2.5 ml/min, including:

a liquid injection pipe, installed in soil between various electrodes and PRBs for injecting surface active agents into polluted soil, a reservoir of surface active agents, connecting with the liquid injection pipe for storing surface active agents, and a third control system, connecting the liquid injection pipe and the reservoir of surface active agents to control injection of surface active agents.

* * * * *